US012545561B2

(12) United States Patent
Chen

(10) Patent No.: US 12,545,561 B2
(45) Date of Patent: Feb. 10, 2026

(54) HAND-HELD JACK

(71) Applicant: Chung Li Chen, Taichung (TW)

(72) Inventor: Chung Li Chen, Taichung (TW)

( * ) Notice: Subject to any disclaimer, the term of this patent is extended or adjusted under 35 U.S.C. 154(b) by 357 days.

(21) Appl. No.: 18/381,683

(22) Filed: Oct. 19, 2023

(65) Prior Publication Data

US 2024/0083723 A1 Mar. 14, 2024

(51) Int. Cl.
*B66F 1/02* (2006.01)
*B25B 5/06* (2006.01)

(52) U.S. Cl.
CPC ................ *B66F 1/02* (2013.01); *B25B 5/068* (2013.01)

(58) Field of Classification Search
CPC . B25B 5/068; B25B 5/085; B66F 1/00; B66F 1/02
See application file for complete search history.

(56) References Cited

U.S. PATENT DOCUMENTS 11,603,297 B1 * 3/2023 Chen ......................... B66F 1/02

OTHER PUBLICATIONS

Strauss, R. Lifting and Lowering Tool (Year: 2023).*

* cited by examiner

*Primary Examiner* — Tyrone V Hall, Jr.

(57) ABSTRACT

A hand-held jack has a main body, including a frame on a grip, the frame having a shaft hole passing through a first chamber and a second chamber therein, a jacking member being fixed to a front end of the frame; and a slow-down device. The slow-down device includes a swing seat pushed by the first spring and mounted in the second chamber; at least one shaft clamp and at least one restricting plate urged by a third spring that are disposed in a first accommodating groove and a second accommodating groove of the swing seat for clamping a lift shaft; and an eccentric push member having an eccentric portion resting on the restricting plate and a push portion. When a workpiece is lifted by the hand-held jack, the slow-down device lowers the workpiece slowly.

6 Claims, 10 Drawing Sheets

HAND-HELD JACK

FIELD OF THE INVENTION

The invention relates to jacks, and more particularly to a hand-held jack having a slow-down device that is able to lower a workpiece slowly and adjust the height of the workpiece slightly after the workpiece is lifted.

BACKGROUND OF THE INVENTION

A conventional clamp structure comprises a handle. When is use, the handle is pressed and a mobile clamp body is operated relative to an immovable clamp body to clamp a workpiece. If the operator wants to stretch, lift or jack up the workpiece manually, it is necessary to use a manual jack for performing an action opposite to the clamp tool described above.

A conventional jack is shaped as a gun. When in use, a drive handle is pressed to move first and second support plates away from each other, so as to lift or jack up a workpiece. However, after lifting (jacking) the workpiece, when the operator wants to lower the workpiece or adjust the height of the workpiece slightly, a very complicated structure or mechanism is used for avoiding the impact of the instantaneous drop of the workpiece. Based on the demands of simpler structure, more stable operation and easier maintenance, there is a need for breakthroughs in the structure of the above-mentioned manual jack.

SUMMARY OF THE INVENTION

The primary object of the invention is to provide a hand-held jack, comprising a main body, a lift shaft, at least one step clamp, a handle, and a slow-down device.

The main body includes a frame on an upper end of a grip. The frame has a partition therein for partitioning an internal space of the frame into a first chamber and a second chamber. A jacking member is fixedly connected to a front end of the frame in front of the first chamber. An upper edge of the jacking member is higher in height than an outer surface of an upper end of the frame. The frame has a shaft hole passing through the first chamber and the second chamber. A stop portion is disposed on an upper edge of the second chamber of the frame.

The lift shaft is inserted in the shaft hole and passes through the first chamber and the second chamber. The lift shaft is movable axially in the shaft hole. A support member is fixedly connected to one end of the lift shaft. When the lift shaft is moved axially, the jacking member is moved toward/ or away from the support member.

The step clamp is mounted in the first chamber. The step clamp has a receiving hole corresponding in shape to the cross-section of the lift shaft for insertion of the lift shaft. A first spring is sleeved on the lift shaft against a first side of the step clamp for pushing a second side of the step clamp to abut against the partition, such that the step clamp does not clamp the lift shaft normally.

The handle is pivotally connected to a lower edge of the first chamber of the frame. The handle has an operating portion located outside the frame and a push end. An angle is defined between the operating portion and the grip. The push end extends into the first chamber and is in contact with the second side of the step clamp.

The slow-down device includes a swing seat, at least one shaft clamp, a second spring, at least one restricting plate, a third spring, and an eccentric push member.

The swing seat is mounted in the second chamber. The swing seat has a seat body. One side of the seat body has a through hole for the lift shaft to pass through. The interior of the seat body has a first accommodating groove and a second accommodating groove that are spaced apart by a spacer. The through hole passes through the spacer. The seat body further has a pivot portion under the second accommodating groove.

The shaft clamp is mounted in the first accommodating groove of the swing seat. The shaft clamp has a clamping hole corresponding in shape to the cross-section of the lift shaft for insertion of the lift shaft. An upper end of the shaft clamp extends to the stop portion and is restricted/or blocked by the stop portion.

The second spring is sleeved on the lift shaft. One end of the second spring is supported by the spacer, and the other end of the second spring is pressed against the side of the seat body of the swing seat. Because the upper end of the shaft clamp is restricted by the stop portion, the shaft clamp is slightly inclined to clamp the lift shaft via the clamping hole, thereby restricting the lift shaft from moving in a direction opposite to the jacking member normally.

The restricting plate is mounted in the second accommodating groove of the swing seat. The restricting plate has a locking hole corresponding in shape to the cross-section of the lift shaft for insertion of the lift shaft. A lower end of the restricting plate extends downward to form a resisting portion.

The third spring is located in the second accommodating groove of the swing seat and is sleeved on the lift shaft. The third spring presses the restricting plate to lean against the spacer, so that the restricting plate is slightly inclined to clamp the lift shaft via the locking hole in a unidirectional manner, thereby restricting the restricting plate from moving in a direction opposite to the support member normally.

The eccentric push member has a rotor pivotally connected to the pivot portion of the swing seat. One end of the rotor has an eccentric portion that rests on the resisting portion of the restricting plate. The other end of the rotor extends out of the second chamber and has a push portion.

When the hand-held jack is used to jack up a workpiece, the jacking member is moved away from the support member. When the shaft clamp and the restricting plate do not clamp the lift shaft and the support member leans against a support surface, the main body can be directly moved upward along the lift shaft for adjusting the jacking member to approach the workpiece quickly. The operator holds the grip and pulls the operating portion of the handle to move the handle back and forth. During the process, the push end of the handle pushes against the step clamp to clamp the lift shaft in a slightly inclined manner, thereby producing an anti-slip action to push the main body to move upward on the lift shaft. The jacking member gradually lifts the workpiece to the target height. If the operator wants to lower the workpiece from the target height, the push portion of the eccentric push member is pressed. During the process, the rotor rotates, and the eccentric portion is blocked and pushed back by the resisting portion of the restricting plate, such that the swing seat swings slightly to release the lift shaft from the shaft clamp. Through the weight of the workpiece, when the main body is lowered by a distance of a drop height, the shaft clamp automatically clamps the lift shaft, and the push portion of the eccentric push member returns to the original position before pressing simultaneously, such that the push portion of the eccentric push member performs repeated push operations to gradually lower the height of the workpiece by lowering a drop height at a time. The hand-held jack is used to lift the work piece. For avoiding excessive impact or slightly adjusting the height of the workpiece when it is lowered, the simple structure and simple operation of the slow-down device can achieve the needs and benefits of lowering the workpiece slowly.

Preferably, the jacking member of the main body is a steel plate locked at the front end of the frame and has a slot corresponding to the shaft hole. The support member fixed to one end of the lift shaft is a steel plate that is larger in size than the jacking member. The support member has a notch corresponding in shape to the jacking member. The lift shaft is moved in the shaft hole of the frame for moving the jacking member toward or away from the support member. The notch of the support member corresponds in shape to the jacking member. The surface of the jacking member and the surface of the support member are flush with each other in the initial position.

Preferably, a pivot seat is provided on the lower edge of the first chamber of the frame. The pivot seat has a pivot hole extending from the first chamber to the outside of the frame. The push end of the handle is inserted from the pivot hole into the first chamber and is pivotally connected to the pivot seat. The swing angle between the operating portion of the handle and the grip is controlled via the pivot hole, so that the handle can be moved back and forth within the appropriate swing angle.

Preferably, an upper recess is formed on the upper edge of the second chamber of the frame. One side of the upper recess is defined as the stop portion. The upper end of the shaft clamp is received in the upper recess, so that the upper end of the shaft clamp is easily matched with the stop portion.

Preferably, a swing portion is provided on the lower edge of the seat body of the swing seat relative to the position where the grip is connected to the frame. A pivotal portion is provided on the lower edge of the second chamber of the frame. One side of the grip is recessed to form a receiving room communicating with the second chamber. The receiving room is equipped with a trigger that is pivotally connected to the pivotal portion. An actuating end of the trigger is inserted into the second chamber close to the swing portion of the swing seat. When the jacking member is moved away from the support member by a certain distance, the trigger is triggered into the receiving room of the grip. The actuating end of the trigger pushes the swing portion of the swing seat, so that the shaft clamp and the restricting plate simultaneously release the lift shaft. Thus, the jacking member is operated to approach to the support member. The hand-held jack is restored to the initial state quickly.

Preferably, a cover is provided on each of two sides of the frame for sealing the first chamber and the second chamber. The components in the first chamber and the second chamber are protected by the covers, which can prevent external forces or foreign objects from entering the first chamber and the second chamber, so as to ensure the normal operation of the components.

DETAILED DESCRIPTION OF THE PREFERRED EMBODIMENTS

Embodiments of the invention will now be described, by way of example only, with reference to the accompanying drawings.

Figure 1:
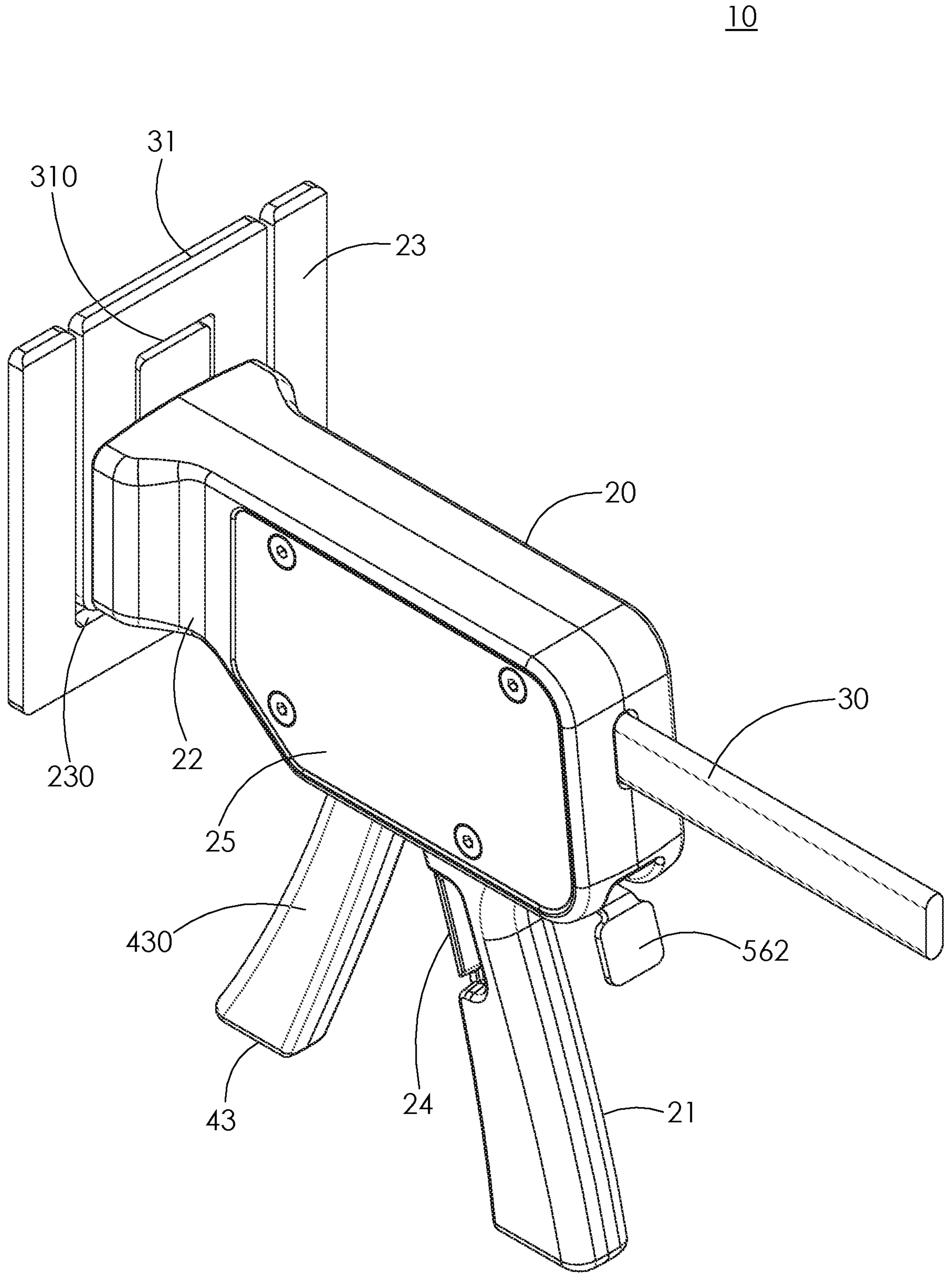
FIG. 1 is a perspective view of the invention.
Figure 2:
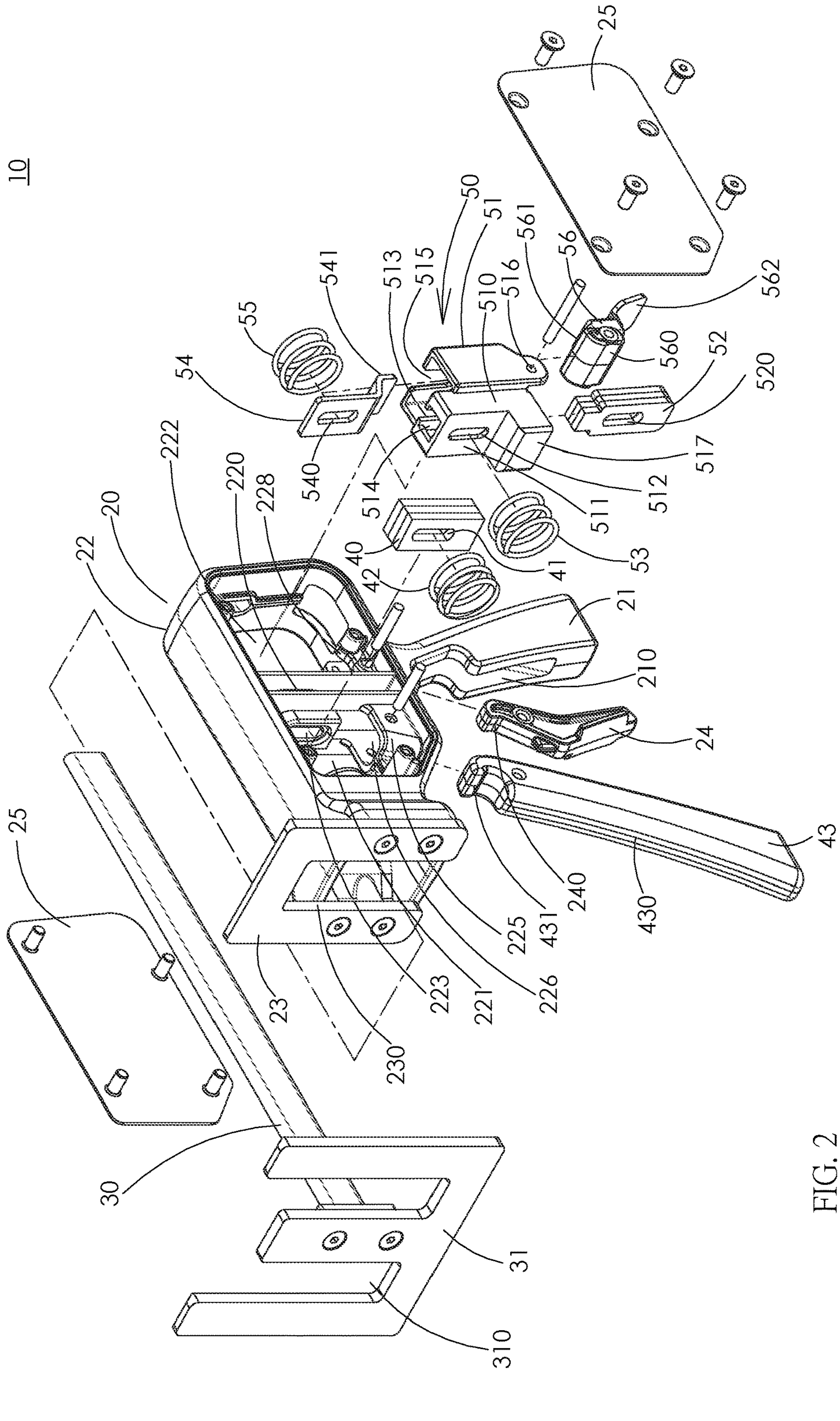
FIG. 2 is an exploded view of the invention.
Figure 3:
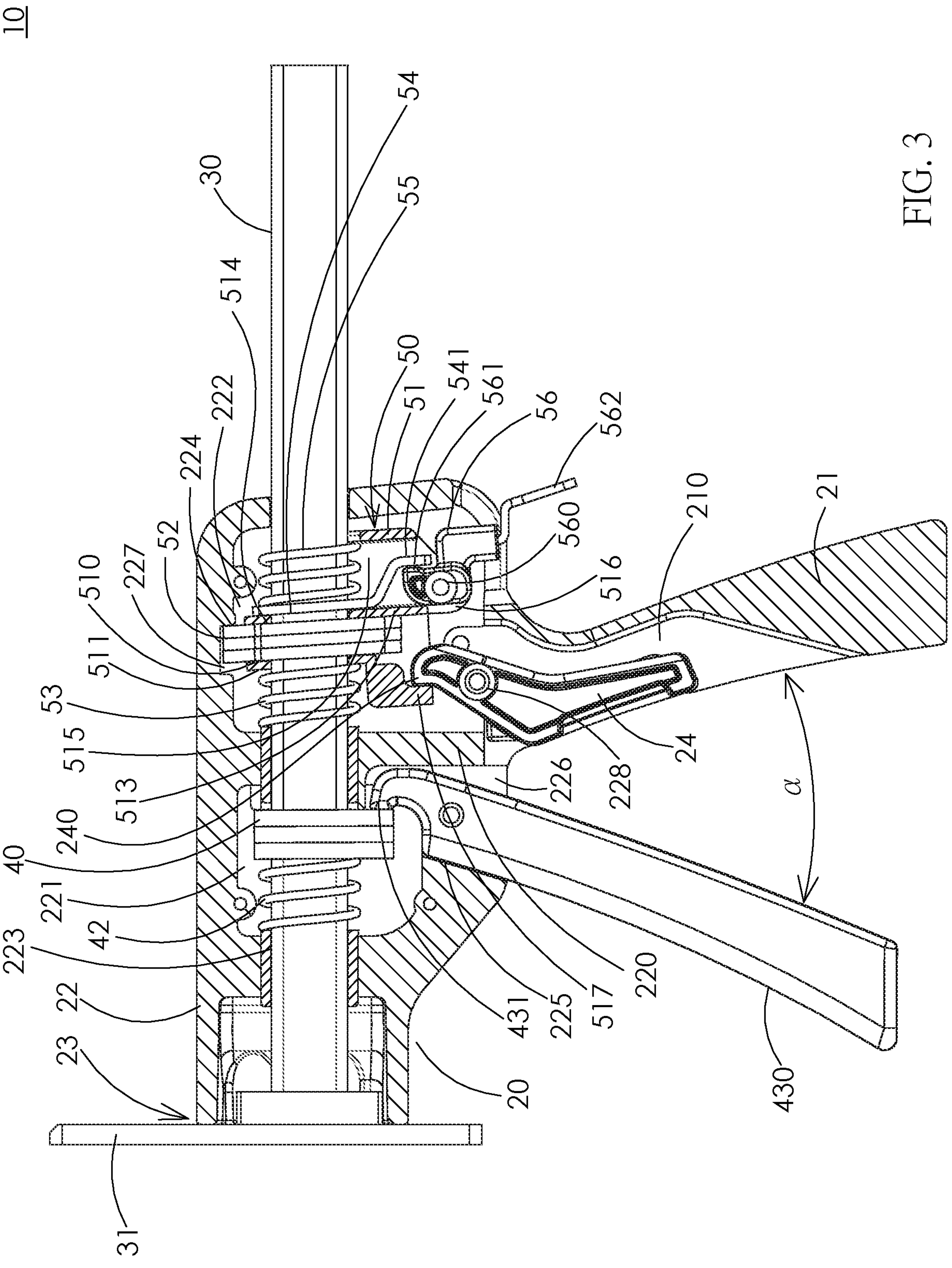
FIG. 3 is cross-sectional view of the main body and the swing seat of the invention.

A hand-held jack 10, as shown in FIG. 1, FIG. 2 and FIG. 3, comprises a main body 20, a lift shaft 30, at least one step clamp 40, a handle 43, and a slow-down device 50.

The main body 20 includes a frame 22 on an upper end of a grip 21. The frame 22 has a partition 220 therein for partitioning an internal space of the frame 22 into a first chamber 221 and a second chamber 222. A jacking member 23 is fixedly connected to a front end of the frame 22 in front of the first chamber 221. An upper edge of the jacking member 23 is higher in height than an outer surface of an upper end of the frame 22. The frame 22 has a shaft hole 223 passing through the first chamber 221 and the second chamber 222. A stop portion 224 is disposed on an upper edge of the second chamber 222 of the frame 22.

The lift shaft 30 is inserted in the shaft hole 223 and passes through the first chamber 221 and the second chamber 222. The lift shaft 30 is movable axially in the shaft hole 223. A support member 31 is fixedly connected to one end of the lift shaft 30. When the lift shaft 30 is moved axially, the jacking member 23 is moved toward/or away from the support member 31.

The step clamp 40 (preferably, three step clamps 40 juxtaposed with each other) is mounted in the first chamber 221. The step clamp 40 has a receiving hole 41 corresponding in shape to the cross-section of the lift shaft 30 for insertion of the lift shaft 30. A first spring 42 is sleeved on the lift shaft 30 against a first side of the step clamp 40 for pushing a second side of the step clamp 40 to abut against the partition 220, such that the step clamp 40 does not clamp the lift shaft 30 normally.

The handle 43 is pivotally connected to a lower edge of the first chamber 221 of the frame 22. The handle 43 has an operating portion 430 located outside the frame 22 and a push end 431. An angle α is defined between the operating portion 430 and the grip 21. The push end 431 extends into the first chamber 221 and is in contact with the second side of the step clamp 40.

The slow-down device 50 includes a swing seat 51, at least one shaft clamp 52, a second spring 53, at least one restricting plate 54, a third spring 55, and an eccentric push member 56.

The swing seat 51 is mounted in the second chamber 222. The swing seat 51 has a seat body 510. One side 511 of the seat body 510 has a through hole 512 for the lift shaft 30 to pass through. The interior of the seat body 510 has a first accommodating groove 514 and a second accommodating groove 515 that are spaced apart by a spacer 513. The through hole 512 passes through the spacer 513. The seat body 510 further has a pivot portion 516 under the second accommodating groove 515.

The shaft clamp 52 (preferably, three shaft clamps 52 juxtaposed with each other) is mounted in the first accommodating groove 514 of the swing seat 51. The shaft clamp 50 has a clamping hole 520 corresponding in shape to the cross-section of the lift shaft 30 for insertion of the lift shaft 30. An upper end of the shaft clamp 52 extends to the stop portion 224 and is restricted/or blocked by the stop portion 224.

The second spring 53 is sleeved on the lift shaft 30. One end of the second spring 53 is supported by the spacer 220, and the other end of the second spring 53 is pressed against the side 511 of the seat body 510 of the swing seat 51. Because the upper end of the shaft clamp 52 is restricted by the stop portion 224, the shaft clamp 52 is slightly inclined to clamp the lift shaft 30 via the clamping hole 520, thereby restricting the lift shaft 30 from moving in a direction opposite to the jacking member 23 normally.

The restricting plate 54 is mounted in the second accommodating groove 515 of the swing seat 51. The restricting plate 54 has a locking hole 540 corresponding in shape to the cross-section of the lift shaft 30 for insertion of the lift shaft 30. A lower end of the restricting plate 54 extends downward to form a resisting portion 541.

The third spring 55 is located in the second accommodating groove 515 of the swing seat 51 and is sleeved on the lift shaft 30. The third spring 33 presses the restricting plate 54 to lean against the spacer 513, so that the restricting plate 54 is slightly inclined to clamp the lift shaft 30 via the locking hole 540 in a unidirectional manner, thereby restricting the restricting plate 54 from moving in a direction opposite to the support member 32 normally.

The eccentric push member 56 has a rotor 560 pivotally connected to the pivot portion 516 of the swing seat 51. One end of the rotor 560 has an eccentric portion 561 that rests on the resisting portion 541 of the restricting plate 54. The other end of the rotor 560 extends out of the second chamber 222 and has a push portion 562.

Figure 4:
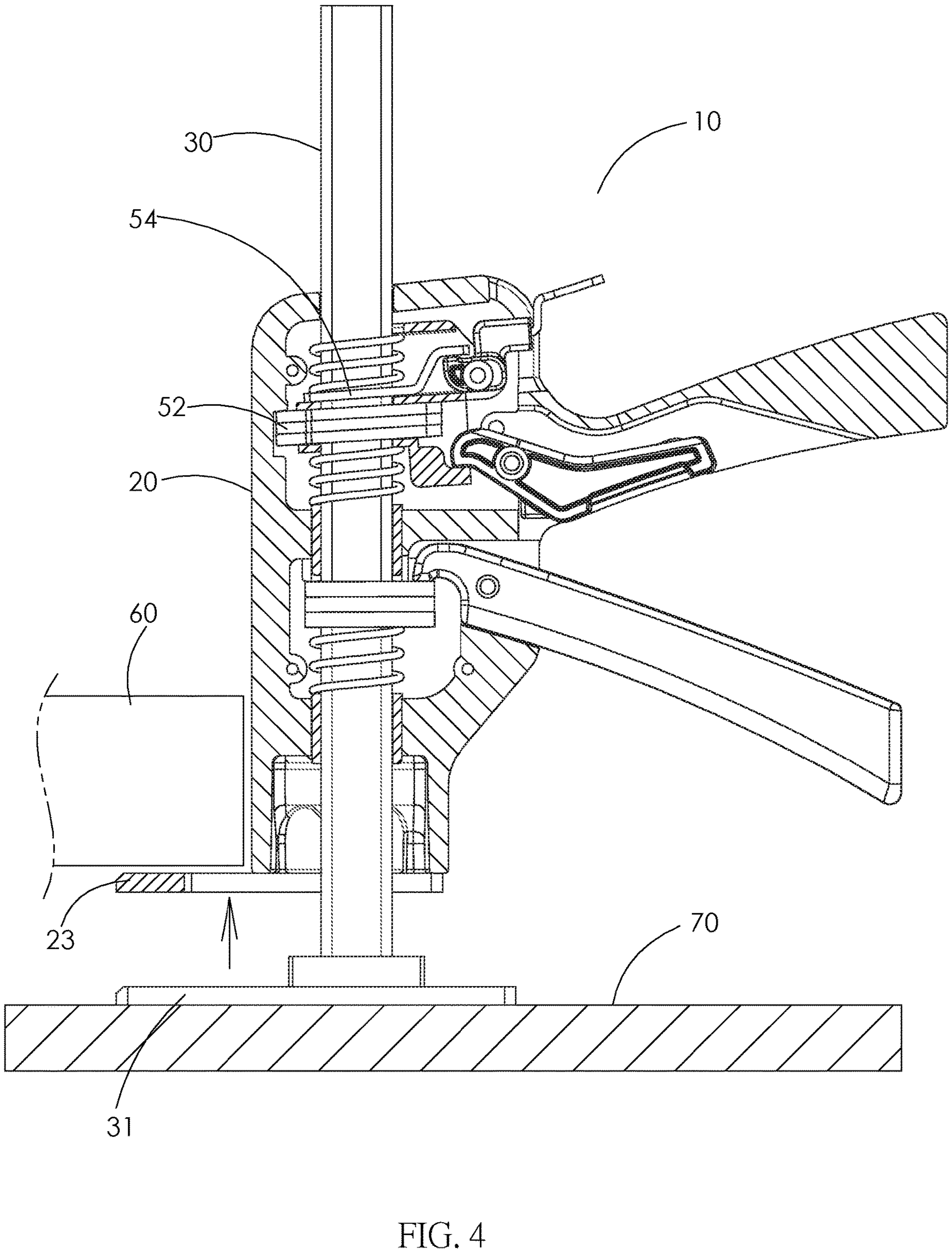
FIG. 4 is a schematic view of the invention when in use, wherein the jacking member is moved away from the support member quickly.
Figure 5:
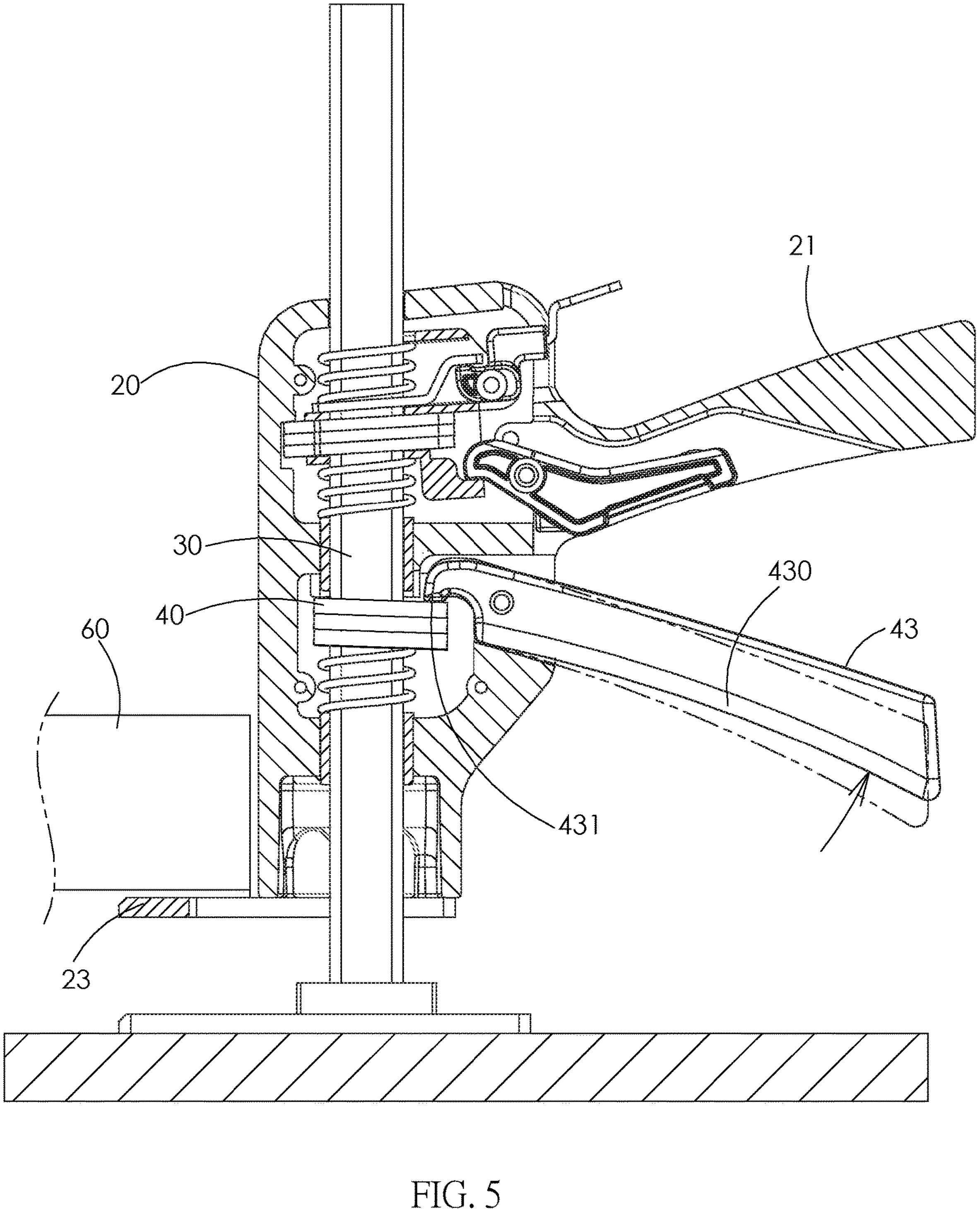
FIG. 5 is a schematic view of the invention when in use, wherein the handle is pulled.
Figure 6:
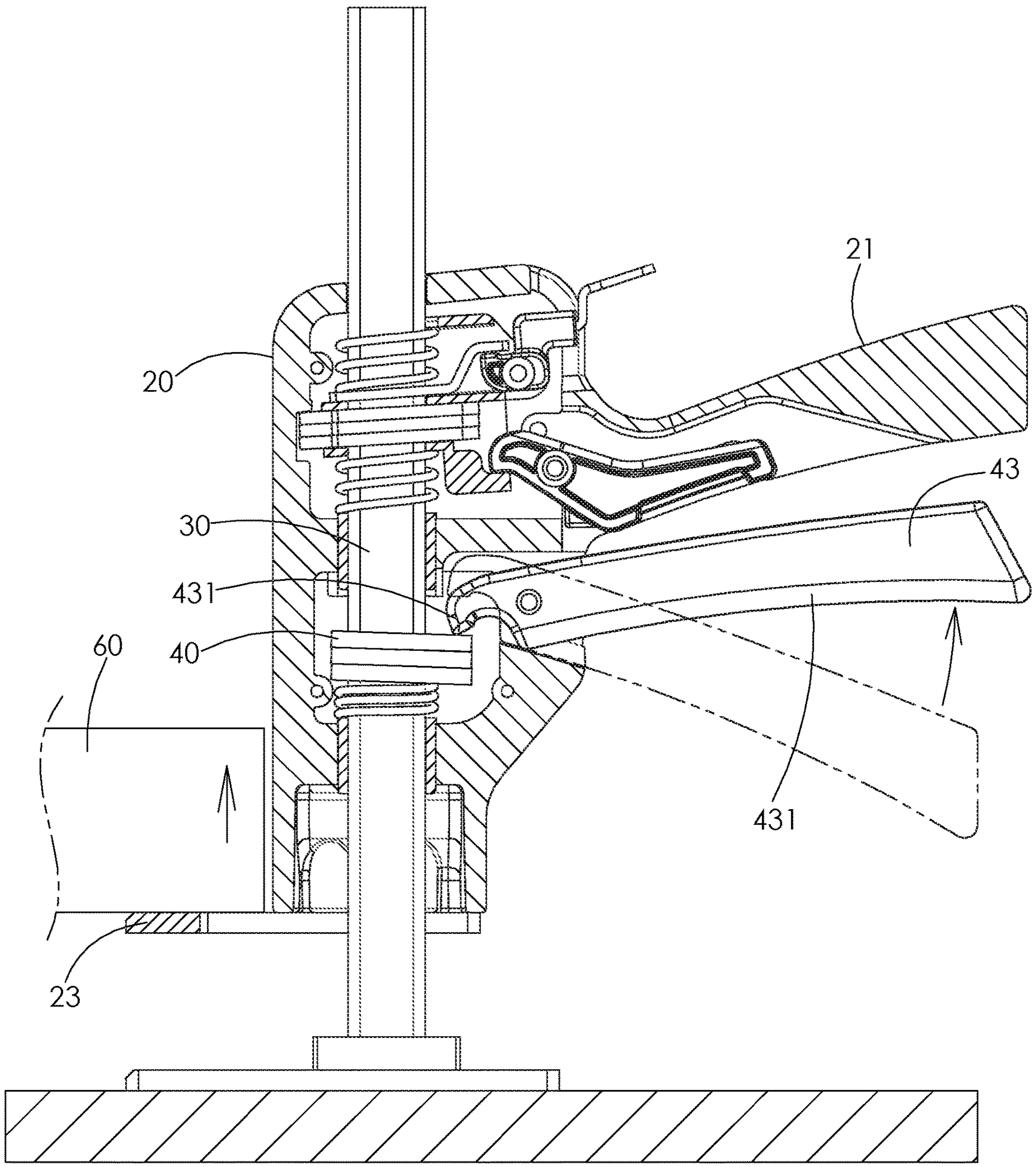
FIG. 6 is a schematic view of the invention when in use, wherein the workpiece is lifted by the jacking member when the handle is pulled.
Figure 7:
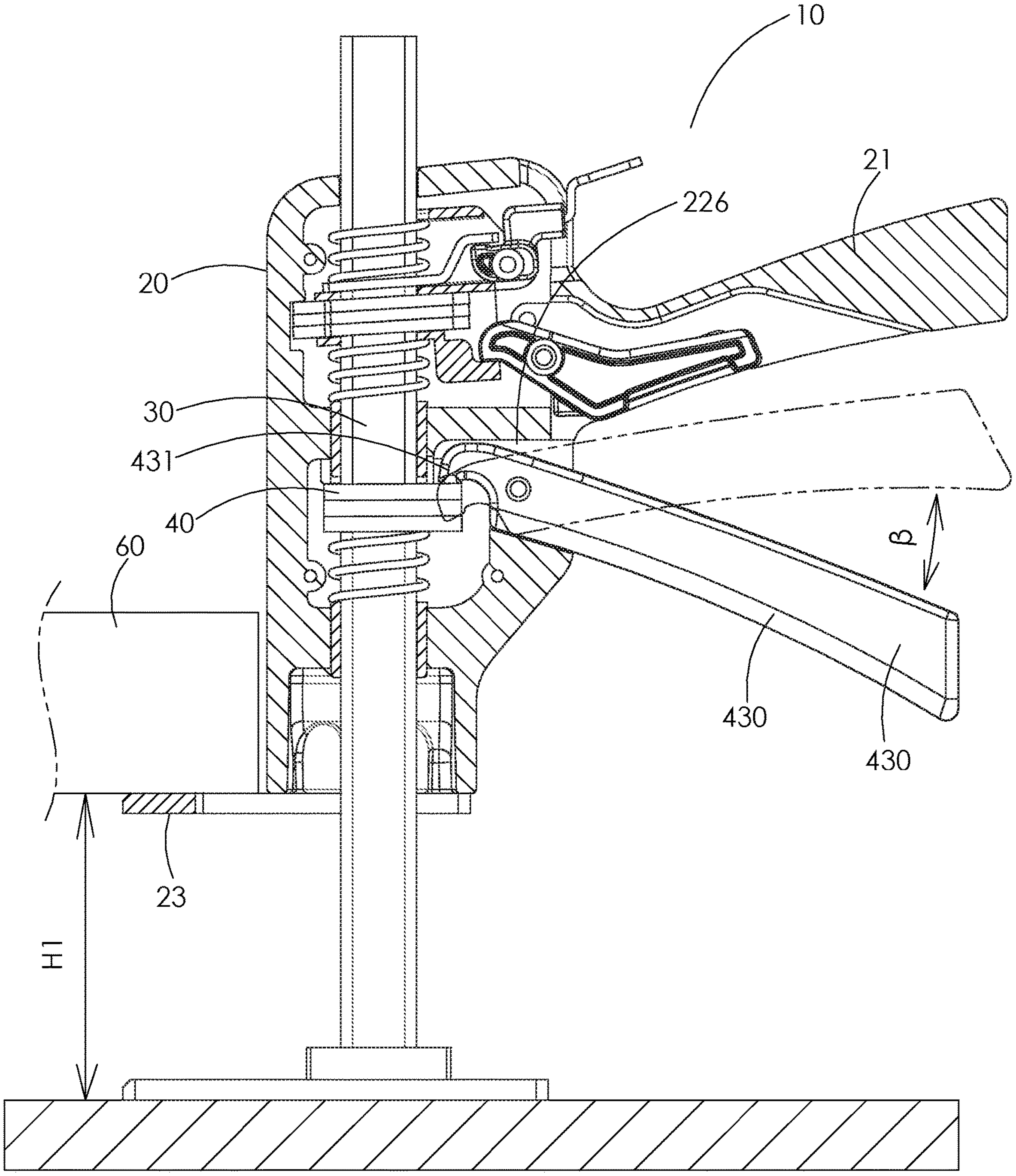
FIG. 7 is a schematic view of the invention when in use, wherein the workpiece is lifted to the target height.
Figure 8:
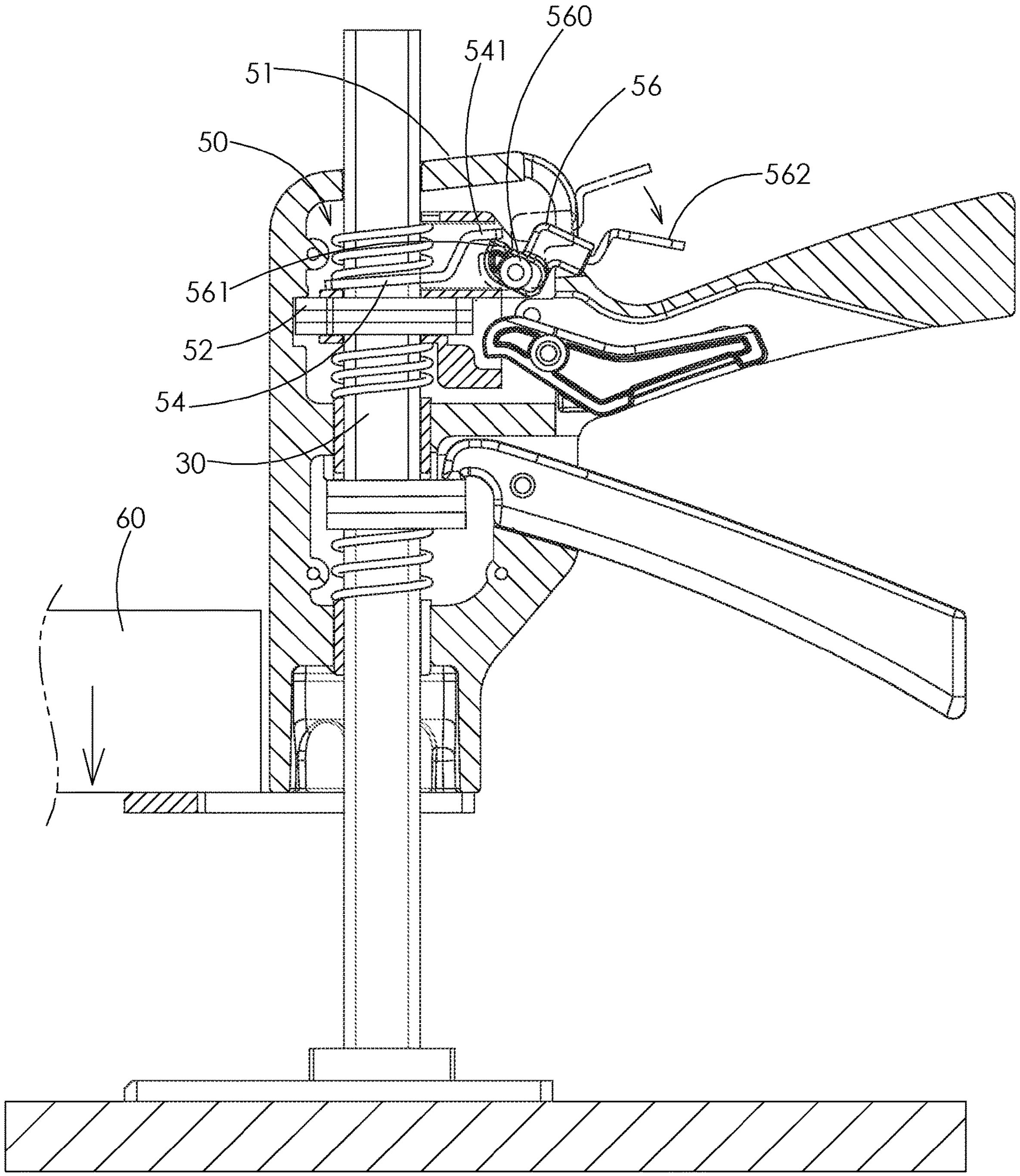
FIG. 8 is a schematic view of the invention when in use, wherein the push portion of the eccentric push member is pressed down.
Figure 9:
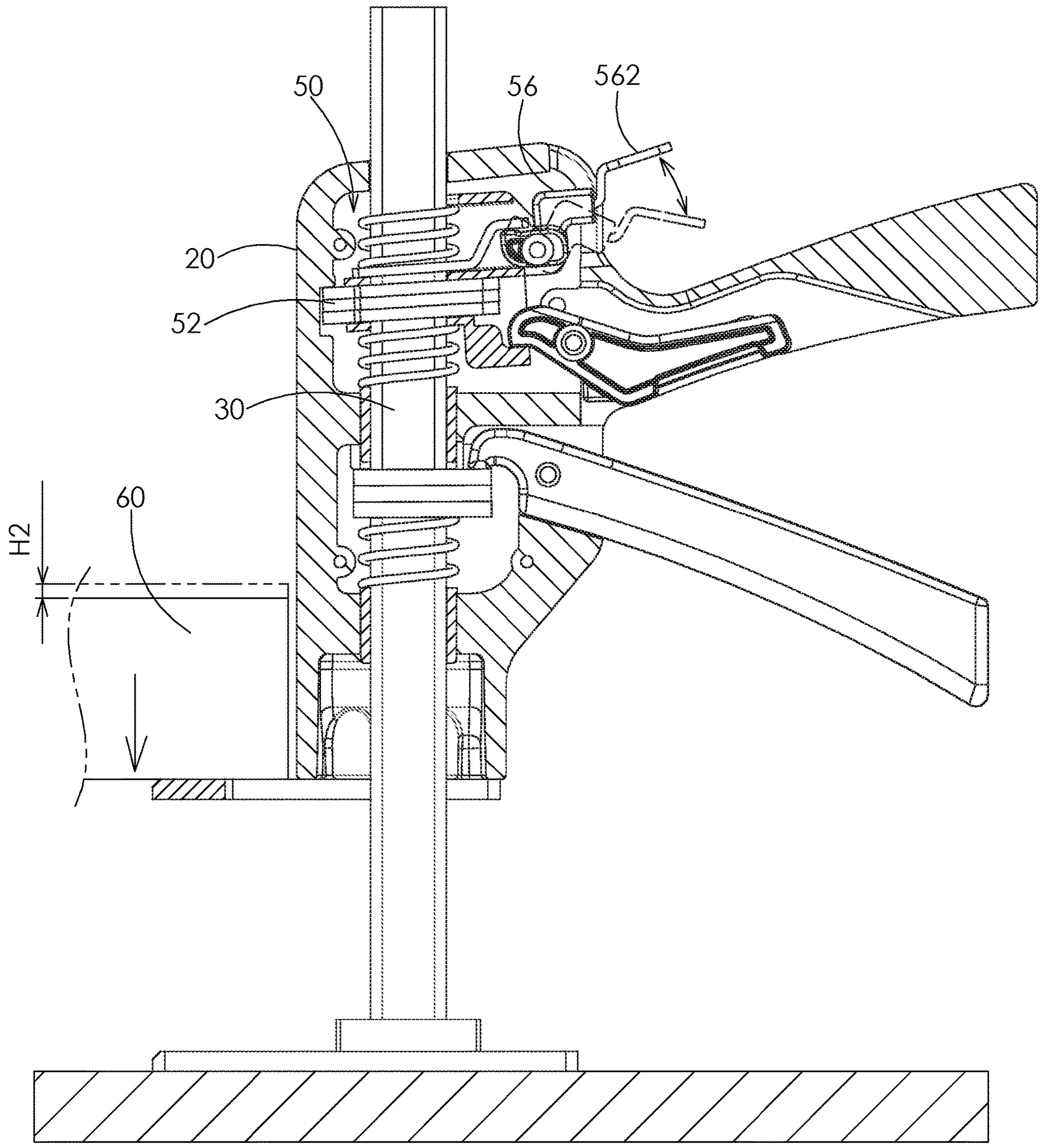
FIG. 9 is a schematic view of the invention when in use, wherein the workpiece is lowered by a drop height after the push portion of the eccentric push member is pressed down.

As shown in FIG. 4, when the hand-held jack 10 is used to jack up a workpiece 60, the jacking member 23 is moved away from the support member 31. When the shaft clamp 52 and the restricting plate 54 do not clamp the lift shaft 30 and the support member 31 leans against a support surface 70, the main body 20 can be directly moved upward along the lift shaft 30 for adjusting the jacking member 23 to approach the workpiece 60 quickly. As shown in FIG. 5, FIG. 6 and FIG. 7, the operator holds the grip 21 and pulls the operating portion 430 of the handle 43 to move the handle 43 back and forth. During the process, the push end 431 of the handle 43 pushes against the step clamp 40 to clamp the lift shaft 30 in a slightly inclined manner, thereby producing an anti-slip action to push the main body 20 to move upward on the lift shaft 30. The jacking member 23 gradually lifts the workpiece 60 to the target height H1. If the operator wants to lower the workpiece 60 from the target height H1, as shown in FIG. 8, the push portion 562 of the eccentric push member 56 is pressed. During the process, the rotor 560 rotates, and the eccentric portion 561 is blocked and pushed back by the resisting portion 541 of the restricting plate 54, such that the swing seat 51 swings slightly to release the lift shaft 30 from the shaft clamp 52. As shown in FIG. 9, through the weight of the workpiece 60, when the main body 20 is lowered (naturally) by a distance of a drop height H2, the shaft clamp 52 automatically clamps the lift shaft 30, and the push portion 562 of the eccentric push member 56 returns to the original position before pressing simultaneously, such that the push portion 562 of the eccentric push member 56 performs repeated push operations to gradually lower the height of the workpiece 60 by lowering a drop height H2 at a time. As shown in FIG. 7, the hand-held jack 10 is used to lift the work piece 60. As shown in FIG. 8 and FIG. 9, for avoiding excessive impact or slightly adjusting the height of the workpiece 60 when it is lowered, the simple structure and simple operation of the slow-down device 50 can achieve the needs and benefits of lowering the workpiece 60 slowly.

Figure 10:
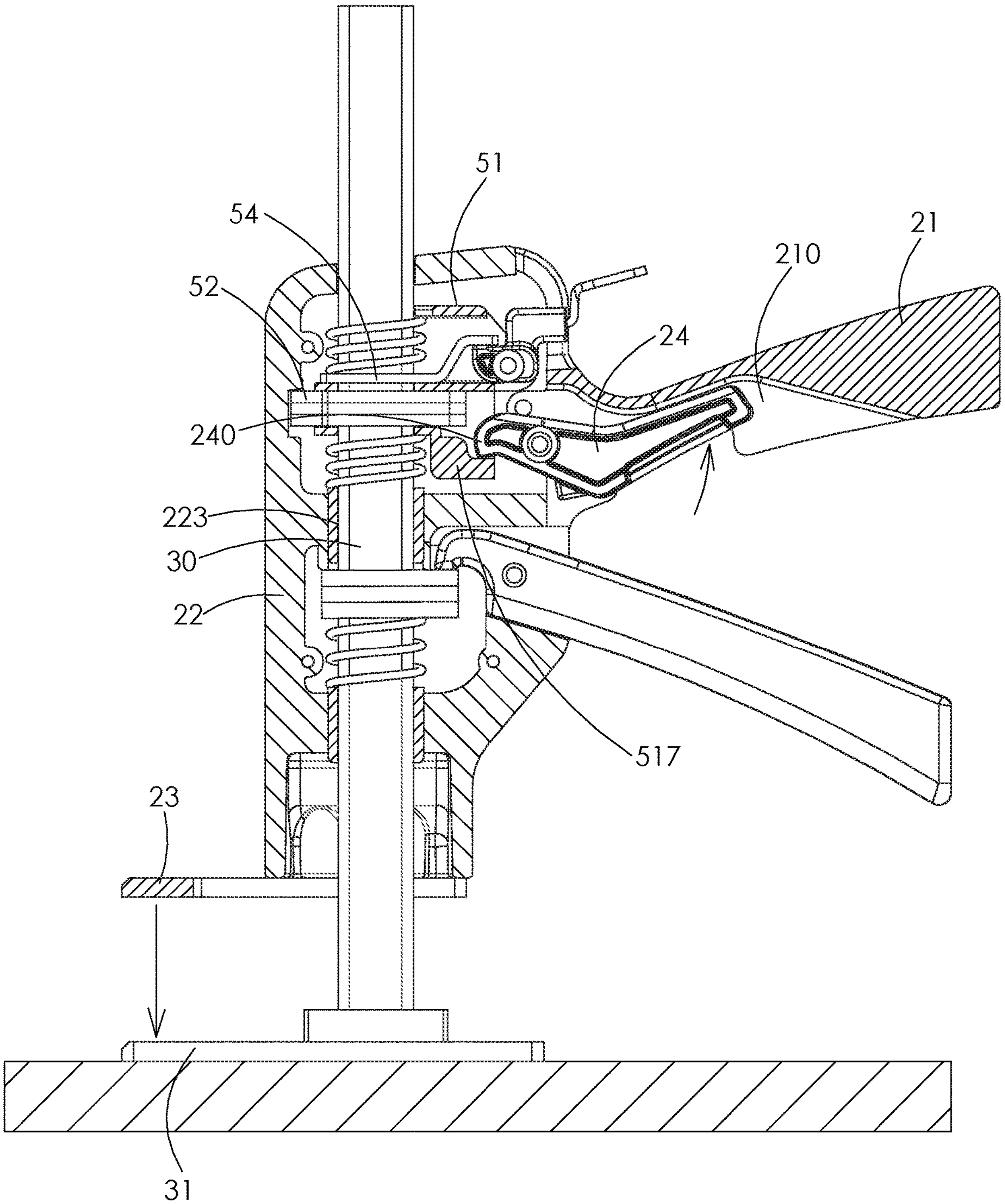
FIG. 10 is a schematic view of the invention when in use, wherein the trigger is operated.

According to the above embodiment, preferably, as shown in FIG. 1, FIG. 2 and FIG. 3, the jacking member 23 of the main body 20 is a steel plate locked at the front end of the frame 22, and has a slot 230 corresponding to the shaft hole 223. The support member 31 fixed to one end of the lift shaft 30 is a steel plate that is larger in size than the jacking member 23. The support member 31 has a notch 310 corresponding in shape to the jacking member 23. As shown in FIG. 10, the lift shaft 30 is moved in the shaft hole 223 of the frame 22 for moving the jacking member 23 to approach the support member 31. As shown in FIG. 1, the notch 310 of the support member 31 corresponds in shape to the jacking member 23. The surface of the jacking member 23 and the surface of the support member 31 are flush with each other in the initial position.

According to the above embodiment, preferably, as shown in FIG. 2 and FIG. 3, a pivot seat 225 is provided on the lower edge of the first chamber 221 of the frame 22. The pivot seat 225 has a pivot hole 226 extending from the first chamber 221 to the outside of the frame 22. The push end 431 of the handle 43 is inserted from the pivot hole 226 into the first chamber 221 and is pivotally connected to the pivot seat 225. As shown in FIG. 7, the swing angle β between the operating portion 430 of the handle 43 and the grip 21 is controlled via the pivot hole 226, so that the handle 43 can be moved back and forth within the appropriate swing angle β.

According to the above embodiment, preferably, as shown in FIG. 2 and FIG. 3, an upper recess 227 is formed on the upper edge of the second chamber 222 of the frame 22. One side of the upper recess 227 is defined as the stop portion 224. The upper end of the shaft clamp 52 is received in the upper recess 227, so that the upper end of the shaft clamp 52 is easily matched with the stop portion 224.

According to the above embodiment, preferably, as shown in FIG. 2 and FIG. 3, a swing portion 517 is provided on the lower edge of the seat body 510 of the swing seat 51 relative to the position where the grip 21 is connected to the frame 22. A pivotal portion 228 is provided on the lower edge of the second chamber 222 of the frame 22. One side of the grip 21 is recessed to form a receiving room 210 communicating with the second chamber 222. The receiving room 210 is equipped with a trigger 24 that is pivotally connected to the pivotal portion 228. An actuating end 240 of the trigger 24 is inserted into the second chamber 222 close to the swing portion 517 of the swing seat 51. As shown in FIG. 10, when the jacking member 23 is moved away from the support member 31 by a certain distance, the trigger 24 is triggered into the receiving room 210 of the grip 21. The actuating end 240 of the trigger 24 pushes the swing portion 517 of the swing seat 51, so that the shaft clamp 52 and the restricting plate 54 simultaneously release the lift shaft 30. Thus, the jacking member 23 is operated to approach to the support member 31. As shown in FIG. 1, the hand-held jack 10 is restored to the initial state quickly.

According to the above embodiment, preferably, as shown in FIG. 1 and FIG. 2, a cover 25 is provided on each of two sides of the frame 22 for sealing the first chamber 221 and the second chamber 222. The components in the first chamber 221 and the second chamber 222 are protected by the covers 25, which can prevent external forces or foreign objects from entering the first chamber 221 and the second chamber 222, ensuring the normal operation of the components.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A hand-held jack, comprising:

a main body, including a frame on an upper end of a grip, the frame having a partition therein for partitioning an internal space of the frame into a first chamber and a second chamber, a jacking member being fixedly connected to a front end of the frame in front of the first chamber, an upper edge of the jacking member being higher in height than an outer surface of an upper end of the frame, the frame having a shaft hole passing through the first chamber and the second chamber, a stop portion being disposed on an upper edge of the second chamber of the frame;

a lift shaft, inserted in the shaft hole and passing through the first chamber and the second chamber, the lift shaft being movable axially in the shaft hole, a support member being fixedly connected to one end of the lift shaft, wherein when the lift shaft is moved axially, the jacking member is moved toward/or away from the support member;

at least one step clamp, mounted in the first chamber, the step clamp having a receiving hole corresponding in shape to a cross-section of the lift shaft for insertion of the lift shaft, a first spring being sleeved on the lift shaft against a first side of the step clamp for pushing a second side of the step clamp to abut against the partition so that the step clamp does not clamp the lift shaft normally;

a handle, pivotally connected to a lower edge of the first chamber of the frame, the handle having an operating portion located outside the frame and a push end, an angle being defined between the operating portion and the grip, the push end extending into the first chamber and being in contact with the second side of the step clamp;

a slow-down device, including a swing seat, at least one shaft clamp, a second spring, at least one restricting plate, a third spring, and an eccentric push member;

the swing seat being mounted in the second chamber, the swing seat having a seat body, one side of the seat body having a through hole for the lift shaft to pass through, an interior of the seat body having a first accommodating groove and a second accommodating groove that are spaced apart by a spacer, the through hole passing through the spacer, the seat body further having a pivot portion under the second accommodating groove;

the shaft clamp being mounted in the first accommodating groove of the swing seat, the shaft clamp having a clamping hole corresponding in shape to the cross-section of the lift shaft for insertion of the lift shaft, an upper end of the shaft clamp extending to the stop portion and being restricted/or blocked by the stop portion;

the second spring being sleeved on the lift shaft, one end of the second spring being supported by the spacer, another end of the second spring being pressed against the side of the seat body of the swing seat, wherein because the upper end of the shaft clamp is restricted by the stop portion, the shaft clamp is slightly inclined to clamp the lift shaft via the clamping hole, thereby restricting the lift shaft from moving in a direction opposite to the jacking member normally;

the restricting plate being mounted in the second accommodating groove of the swing seat, the restricting plate having a locking hole corresponding in shape to the cross-section of the lift shaft for insertion of the lift shaft, a lower end of the restricting plate extending downward to form a resisting portion;

the third spring being located in the second accommodating groove of the swing seat and sleeved on the lift shaft, the third spring pressing the restricting plate to lean against the spacer so that the restricting plate is slightly inclined to clamp the lift shaft via the locking hole in a unidirectional manner, thereby restricting the restricting plate from moving in a direction opposite to the support member normally; and the eccentric push member having a rotor pivotally connected to the pivot portion of the swing seat, one end of the rotor having an eccentric portion that rests on the resisting portion of the restricting plate, another end of the rotor extending out of the second chamber and having a push portion.

2. The hand-held jack of claim 1, wherein the jacking member of the main body is a steel plate locked at the front end of the frame and has a slot corresponding to the shaft hole; the support member fixed to the end of the lift shaft is a steel plate that is larger in size than the jacking member, and the support member has a notch corresponding in shape to the jacking member.

3. The hand-held jack of claim 1, wherein a pivot seat is provided on the lower edge of the first chamber of the frame, the pivot seat has a pivot hole extending from the first chamber to an outside of the frame, and the push end of the handle is inserted from the pivot hole into the first chamber and is pivotally connected to the pivot seat.

4. The hand-held jack of claim 1, wherein an upper recess is formed on the upper edge of the second chamber of the frame, and one side of the upper recess is defined as the stop portion.

5. The hand-held jack of claim 1, wherein a swing portion is provided on a lower edge of the seat body of the swing seat relative to a position where the grip is connected to the frame; a pivotal portion is provided on a lower edge of the second chamber of the frame; one side of the grip is recessed to form a receiving room communicating with the second chamber, the receiving room is equipped with a trigger that is pivotally connected to the pivotal portion, and an actuating end of the trigger is inserted into the second chamber close to the swing portion of the swing seat.

6. The hand-held jack of claim 1, wherein a cover is provided on each of two sides of the frame for sealing the first chamber and the second chamber.

* * * * *